Oct. 7, 1930.　　W. T. MINETT　　1,777,323
WELT GROOVING AND BEVELING MACHINE
Filed Oct. 29, 1925
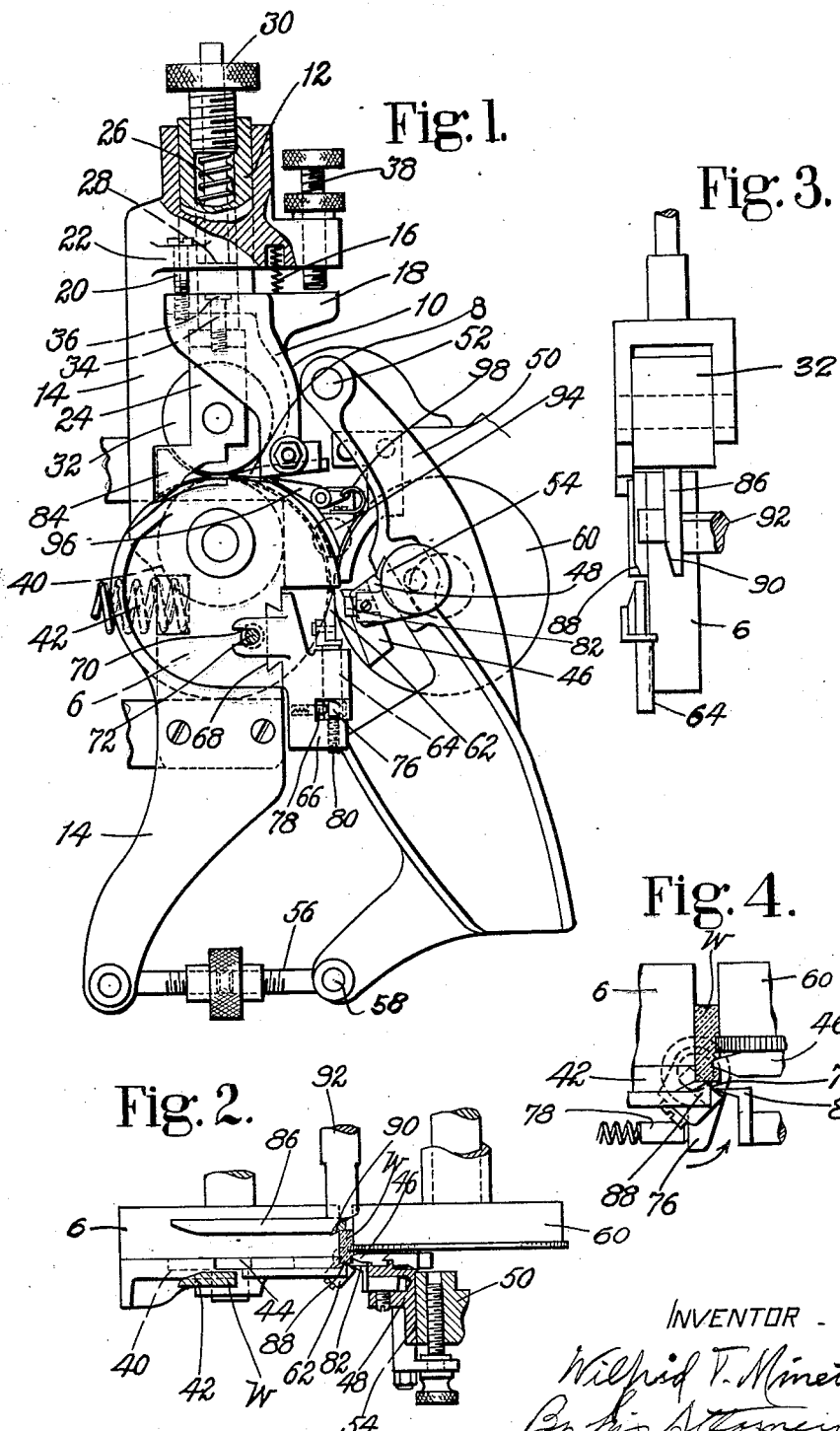
INVENTOR -
Wilfrid T. Minett
By his Attorney,
Nelson W. Howard Patented Oct. 7, 1930

1,777,323

UNITED STATES PATENT OFFICE

WILFRID THOMAS MINETT, OF LEICESTER, ENGLAND, ASSIGNOR TO UNITED SHOE MACHINERY CORPORATION, OF PATERSON, NEW JERSEY, A CORPORATION OF NEW JERSEY

WELT GROOVING AND BEVELING MACHINE

Application filed October 29, 1925, Serial No. 65,678, and in Great Britain November 22, 1924.

This invention relates to welt grooving and beveling machines of the type generally employed in connection with the preparation of welting for use in the manufacture of Goodyear welt shoes and has for an object the provision in such a machine of improved means for insuring greater precision and uniformity in the welt grooving and beveling operations.

Machines of the type referred to operate to bevel the edge and to form a groove in the flesh side of a welting strip, and it is not only of importance that the groove shall be of sufficient depth properly to receive the inseam stitches, independently of variations in the thickness of the welting strip, but it is also important that the portion of the strip lying between the bottom of the groove and the grain side of the strip shall be of sufficient thickness to retain the stitches without danger of weakening or tearing the strip and this latter thickness must be maintained independently of any variations in the depth of the groove or the thickness of the strip. The problem of satisfying these requirements is complicated by the fact that there is often at least one locality within the length of each strip of welting where the stock is so thin that if it were grooved as deeply as the rest of the welting the strip would be dangerously weakened so that it is not practicable simply to reduce the strip to a desired uniform thickness throughout its length and groove the reduced strip to a predetermined, uniform depth. It is also important, in order to facilitate uniformity of results in the application of welting to shoes that the line marking the junction of the bevel face with the grain side of the welting strip shall be spaced uniformly from the edge of the strip throughout the length of the strip and further, that the edge produced by the beveling cut shall be neither so thin as to resemble a feather edge nor so thick as to be incapable of bending readily during the inseam stitching operation whatever the variations in thickness of the strip.

The present invention aims to secure the attainment of the desiderata above referred to, and to this end one feature of the invention consists in the provision, in a machine of the class described, of means to reduce a welding strip to substantially uniform thickness throughout its length, and means thereafter to operate on the strip to form therein a groove, the depth of which varies in accordance with such variations in thickness as may remain in the welting strip.

As illustrated the welting strip is reduced to substantially uniform thickness by the action of a splitting knife, and a grooving knife acts upon the strip after it has been split to cut a groove of a depth equal to approximately one third the thickness of the strip.

Still another feature of the invention consists in the combination of a beveling tool, and means for feeding a strip of welting to the beveling tool, the beveling tool being arranged to move automatically in accordance with variations in the thickness of the welting strip to vary the angle of the beveled face produced by said tool without changing the location of the junction of the beveled face with the face of the welting strip.

With the same general object in view the invention also comprises the combination of a welt beveling knife, a knife support, and means automatically to adjust the knife relatively to the knife support upon variations in the thickness of the welting to impart to the welting a beveled edge having a thickness which varies in accordance with variations in the full thickness of the welting strip.

The invention is more fully explained in the following specification and illustrated in th accompanying drawings, in which Fig. 1 is a view in front elevation of an illustrative machine embodying the invention;

Fig. 2 is a plan view with certain parts broken away showing in detail the grooving and beveling mechanism;

Fig. 3 is a side elevation showing means for guiding the welting strip to the grooving and beveling cutters; and Fig. 4 is an enlarged detail view showing a strip, in section, being operated upon by the cutters.

Referring to the drawings, the invention is therein illustrated as embodied in a welt grooving and beveling machine of the same general type as that disclosed in United States Letter Patent, No. 1,309,567, granted on application of Andrew Eppler, July 8, 1919, to which reference may be had for details of the construction and mode of operation of parts not herein specifically described. The illustrated machine comprises a splitting device to which the welt is first presented so that it may be reduced to a substantially even thickness; a beveling knife mounted to swivel or tilt about a vertical axis in such a manner that the angle of bevel is automatically altered according to the thickness of the welt; a grooving knife mounted to move automatically relatively to the welt strip to impart to the welt a groove having a depth bearing a definite relation to the thickness of the welt; and a welt guide arrangement whereby the edge of the welt at which the grooving and beveling operations are performed is kept against its guide.

In the illustrated construction there is arranged above a work-supporting feed roll 6 a splitting knife 8 which is carried by a supporting arm 10 having a sleeve 12 formed thereon and mounted for vertical movement within a horizontally yieldable but vertically immovable carrier slide 14 in which the work-supporting roll 6 is mounted. The arm 10 is normally urged downwardly by a light spring 16 acting against a projection 18 on the arm and the extent of the downward movement of the arm is limited by an adjustable screw 20 extending through a lug 22 and having screw-threaded engagement with the arm 10. By adjusting the screw 20 the vertical position of the knife 8 may be varied and controlled.

Mounted in the supporting arm 10 is a forked presser roll carrier 24 which is urged downwardly toward the work-supporting roll 6 by a spring 26 which is considerably stronger than the spring 16 and which is confined lengthwise between a shoulder 28, carried by the presser roll carrier 24, and an adjustable knurled screw 30 threaded into the sleeve 12 of the supporting arm 10. Rotatably mounted in the fork of the carrier 24 and driven by gearing from the work-supporting roll 6 is a toothed presser and strip feeding roll 32 downward movement of which, in relation to the splitting knife 8 and work-supporting roll 6, is limited by a screw 34, the lower portion of the screw 34 having threaded engagement with the presser roll carrier 18 and the head of the screw being located within a recess 36 formed in the supporting arm 10. By adjusting this screw 34 the vertical position of the presser roll 32 relatively to the knife 8 and work-supporting roll 6 may be varied. When a welting strip, such as that shown at W in Figs. 2 and 4, is presented to the work-supporting and presser rolls, the presser roll 32 and splitting knife 8 are raised together by the strip against the action of the light spring 16 until the abutment 18 engages an adjustable stop screw 38 threaded through a lug on the horizontally movable carrier slide 14, which determines the thickness to which the welt strip is split. Thereafter the presser roll may be further raised against the action of the strong spring 26 which holds the strip against the work-supporting roll 6 and, as above pointed out, during this further movement of the presser roll the knife 8 is fixed against further upward movement by means of the abutment 18 engaging the stop 36. The presser roll 32 and the knife 8 are normally set down close to the supporting roll 6 with the presser roll slightly below the knife edge so that if a portion of the strip W is thinner than the thickness to which the strip is to be split and for which the stop screw 38 has been set such thin portion will be fed by the presser roll under the pressure of the light spring 16 without being split—the splitting only commencing after the knife support 10 has engaged the stop screw 38.

A freely rotatable roll 40 is mounted in a stationary support 42 over which one edge of the welt strip passes as it is fed to the beveling and grooving tools, as best shown in Fig. 2. The roll 40 projects slightly through the stationary surface of the support at 44 to engage the underside of the strip W as it is fed to the splitting knife 8 and to assist in carrying the strip over the support 42 to prevent drag of the strip upon the stationary surface of the support.

A grooving knife 46 is fixed to a slide 48 which is mounted in an arm 50 pivoted to the machine frame above the knife at 52. By means of a hand screw 54 the slide 48 may be adjusted laterally of the path of feed of the welting strip W to vary the distance of the groove from the edge of the strip. The arm 72 is pivotally connected beneath the knife 46 to one end of a lengthwise adjustable connecting rod 56 which at its opposite end is pivotally connected at 58 to the horizontally movable carrier slide 14. As illustrated, the distance of the grooving knife edge from the pivot 52 of the arm 50 is substantially one-third of the distance from the pivot 58 to the pivot 52 so that when the welting strip, in passing between a fixed feed roll 60 and the movable roll 6, causes the latter roll to move to the left of the position illustrated in Fig. 1 of the drawings, let us say, one unit, this unit of movement will be directly imparted to the pivot 58 through the carrier slide 14 and horizontal link 56, causing the pivot 58 to move to the left one unit to swing the arm 50 about its pivot 52 and move the edge of the knife 46 toward the feed roll 6 a distance of one-third unit. By this means, and assisted by an initial adjustment of the grooving knife 46, the depth of the groove is always cut to one-third of the thickness of the strip despite variations in the thickness of the strip.

A beveling knife 62 is mounted for pivotal or swinging movement about a vertical axis and is positioned at the bite of the beveling feed roll 60 and the main feed roll 6 just beneath the lower end of the stationary work support 42 so that as the welting strip is fed downwardly over the support 42 the strip is acted upon by the knife. As shown in Fig. 1, the knife 62 is fixed upon the upper end of a vertical rod 64 pivoted in a bracket 66 adjustable transversely of the path of feed of the strip. For this purpose the bracket 66 is connected by means of a slide and key arrangement 68 with the carrier slide 14 and is adapted to be moved toward and away from the welting strip by means of an adjusting screw 72 received in a slot 70 in the bracket 66. The axis of the rod 64 passes through the knife edge 74 (Fig. 4) and the rod has keyed to it an arm 76 which is acted upon by a spring-pressed plunger 78 carried in the bracket 66 to swing the knife 46 about its axis and in the direction indicated by the arrow in Fig. 4. A screw 80 located in the bracket 66 beneath the rod 64 permits adjustment of the rod vertically. The axis of the knife 62, projected upwardly, passes through the lower edge of the face of the stationary work support 42 beneath which lower edge the knife 62 is situated. The knife 62 is adjusted laterally of the path of feed so that the axis is positioned behind that edge of the groove which is nearer the beveled edge of the strip. By locating the knife 62 so that its axis extends through the lower edge of the stationary work support 42 and the knife edge, it will be seen that the junction of the bevel on the welting strip with the face of the strip is maintained a uniform distance from the edge of the strip irrespective of variations in welt thickness, so that the bevel does not extend behind the groove in the opposite face of the welting to weaken the strip. The spring-pressed plunger 78 tends to swing the beveling knife 62 about its pivotal axis and serves to hold the side of the knife in engagement with a knife-edged stop 82 fixed to the grooving knife slide 48. With this arrangement, as the thickness of the strip increases and the beveling knife is moved away from the stop 82, the angular position of the knife is changed so that the thickness of the beveled edge of the strip is maintained in a constant proportion of about one-third of the thickness of the strip, notwithstanding variations in the thickness of the strip. As illustrated the bevel edge is maintained about one-third as thick as the full thickness of the strip.

The welting strip is guided to the splitting devices between a stationary edge gauge 84, formed on the forked presser roll carrier 24, and a guide 86 adjustable laterally of the strip, and the strip is guided to the grooving and beveling knives between a guiding face formed on the stationary strip edge support 42 and a face on the adjustable guide 86. To insure that the edge of the welt strip upon which the grooving and beveling operations are performed shall be accurately guided to the knives even though the width of the strip may vary, the guiding face on the stationary support 42 has at its lower end, close to the grooving and beveling knives, a projection against which the edge of the strip bears as it is fed. This projection (indicated at 88 in Figs. 2, 3 and 4) forms the actual guide for the welt strip to the grooving and beveling knives and by its crowding action on the edge of the strip insures that the edge is held firmly against the adjustable guide 86. This adjustable gage 86 is tapered or recessed somewhat at 90 to allow for the lateral displacement of the strip due to the crowding action. The adjustable guide 86 has extending rearwardly from it a shank 92 which is slidably mounted on the horizontally movable carrier slide 10, and has at its rear end a recess which receives the ball end of one arm of a lever pivoted on the carrier slide, not shown in the drawings nor claimed as a part of applicant's invention but fully set forth in the Letters Patent referred to above. As is also shown in the said Letters Patent, another arm of the lever is held by a spring against an adjusting screw threaded into the carrier slide so that adjustment of this screw varies the position of the guide laterally of the path of the welting strip. The adjustable guide 86 has a forwardly projecting portion 94 which deflects the welting strip downwardly after it leaves the splitting knife 8 towards the bite of the main feed roll 6 and the roll 60 and this portion 94 has pivoted to it a finger 96 (Fig. 1) the outer end of which is held upwardly against the under side of the splitting knife 8 by means of a spring 98 arranged to deflect the end of the welting strip W downwardly as it leaves the splitting knife.

While the illustrated embodiment of the invention has incorporated in it both splitting, grooving and beveling knives it is to be recognized that any one of the knives might be used alone or any two might be used in combination as may be found desirable without in any respect departing from the invention.

Having thus described my invention what I claim as new and desire to secure by Letters Patent of the United States is:

1. In a machine of the class described, the combination of means to reduce a welting strip to substantially uniform thickness throughout its length, and means subsequently to operate upon the strip to form therein a groove of a depth equal to approximately one-third of the thickness of the welting irrespective of such variation in thickness as may remain in the strip.

2. In a machine of the class described, the combination of a feed roll, a presser roll located in proximity to the feed roll and capable of being moved away from the feed roll by the work, a splitting knife located adjacent to the presser roll, connections between the presser roll and the knife for moving the knife away from the feed roll constructed and arranged to permit relative bodily movement between the presser roll and the knife responsive to variation in the thickness of a piece of work being fed through the machine, and means for arresting further movement of the knife after it has been moved a predetermined distance away from the feed roll.

3. In a machine of the class described, the combination, with a feed roll, of a splitting knife for reducing a welting strip to a substantially uniform thickness, and means for controlling the position of the knife constructed and arranged to cause the knife to ride over thin spots in the welting strip without cutting but to reduce thicker portions of the strip to a desired thickness.

4. In a machine of the class described, the combination with a feed roll and a presser roll of a splitting knife arranged to reduce a welting strip, the knife being so arranged relatively to the feed and presser rolls that upon the thickness of the welting strip exceeding a desired thickness, the knife will operate to reduce the strip and upon the thickness of the strip becoming less than a desired thickness, the knife will be ineffective to reduce the strip.

5. In a machine of the class described, a beveling knife arranged to turn about an axis, and means for turning the knife to enable it to impart to a welting strip a beveled edge the thickness of which varies in accordance with the thickness of the welting strip irrespective of variations in strip thickness.

6. In a machine of the class described, a beveling knife, a knife support, and means automatically to adjust the knife relatively to the knife support upon variations in the thickness of the welting to impart to the welting a beveled edge having a thickness which varies in accordance with variations in the full thickness of the welting strip.

7. In a machine of the class described, a beveling knife, and means for varying the position of the knife to cause it to impart to a welting strip a beveled edge the thickness of which varies in accordance with the variations in the thickness of the welting strip and the junction of which with the face of the strip is spaced uniformly from the edge of the strip throughout its length irrespective of variations in thickness of the welting strip.

8. In a machine of the class described, a beveling tool, and means to feed a welting strip to the beveling tool, the beveling tool being arranged to move automatically in accordance with variations in the thickness of the welting strip to vary the angle of the beveled face produced by said tool without changing the location of the junction of the beveled face with the face of the strip.

9. In a machine of the class described, in combination, means arranged to form in a welting strip, a groove the depth of which varies in accordance with variations in the thickness of the strip, and means for beveling the edge of the strip constructed and arranged to vary the angle of bevel in accordance with variations in the thickness of the strip.

10. In a machine of the class described, the combination of a splitting knife arranged to reduce a welting strip of uneven thickness to a substantially uniform thickness, and a beveling knife movable in response to variations in thickness still remaining in the strip to impart to the strip a beveled edge with thickness of which varies in accordance with said variations in strip thickness.

11. In a machine of the class described, the combination of a splitting knife arranged to reduce a welting strip of uneven thickness to a substantially uniform thickness, and a plurality of means movable in response to variations in thickness still remaining in the strip to impart to the strip a groove and a beveled edge, the dimensions of which vary in accordance with said variations in strip thickness.

12. In a machine of the class described, a beveling tool and adjusting means therefor constructed and arranged to bevel the edge of a welting strip throughout a portion only of the thickness of the strip and to maintain the beveled surface produced by said tool spaced from the face of the material remote from the beveled surface by a distance equal to approximately one-third the thickness of the material notwithstanding variations in said thickness.

13. In a machine of the class described, a knife, a fixed guide located adjacent to the knife, a movable guide located in nearby relation to the fixed guide and having a recess therein, and a projection carried by the fixed guide and arranged to crowd material fed to the knife against the recess in the movable guide to insure proper feeding of the material.

14. In a machine of the class described, a stationary work support, a movable work support located in proximity to the stationary support, and a freely rotatable feed wheel located in such a position relatively to the stationarly work support that a portion of the periphery of the wheel extends through and above the surface of the stationary work support to prevent drag of the work upon the stationary support as the work is being fed.

15. In a machine of the class described, a pair of cooperating feed rolls for feeding a welting strip, one of the feed rolls being adapted to yield during a splitting operation, and the other being adapted to yield during a grooving and beveling operation, both yielding actions being controlled by variations in the thickness of the strip.

16. In a machine of the class described, the combination of means to reduce a welting strip to substantially uniform thickness throughout its length, and means subsequently operable upon the strip to form therein a groove the depth of which varies in accordance with such variations in thickness as may remain in the welting strip.

17. In a machine of the class described, welt evening, grooving and beveling instrumentalities, and a yielding roll the periphery of which at different positions about its axis is adapted to act as a work support for a welt strip while the latter is being evened, grooved and beveled.

18. In a machine of the class described, welt evening, grooving and beveling instrumentalities, a presser roll associated with the evening instrumentality, and a work supporting roll adapted to co-operate unyieldingly with the presser roll to feed the work to the evening instrumentality but adapted to act as a yielding support for the work while the latter is being operated upon by the grooving and beveling instrumentality.

In testimony whereof I have signed my name to this specification.

WILFRID THOMAS MINETT.